(12) United States Patent  
Wood

(10) Patent No.: US 7,134,830 B2  
(45) Date of Patent: Nov. 14, 2006

(54) GRAIN WAGON WITH IMPROVED GRAIN CONTAINER

(75) Inventor: James E. Wood, Ft. Recovery, OH (US)

(73) Assignee: J. & M. Manufacturing Co., Inc., Fort Recovery, OH (US)

( * ) Notice: Subject to any disclaimer, the term of this patent is extended or adjusted under 35 U.S.C. 154(b) by 319 days.

(21) Appl. No.: 10/832,161

(22) Filed: Apr. 26, 2004

(65) Prior Publication Data

US 2005/0238470 A1  Oct. 27, 2005

(51) Int. Cl.  
*B60P 1/40* (2006.01)

(52) U.S. Cl. ........................ 414/523; 414/526

(58) Field of Classification Search ............ 414/523, 414/526; 296/183.1, 198  
See application file for complete search history.

(56) References Cited

U.S. PATENT DOCUMENTS

| | | | | |
|---|---|---|---|---|
| 2,619,355 | A * | 11/1952 | Trees | 239/656 |
| 3,572,643 | A * | 3/1971 | Birdsall | 366/155.1 |
| 3,874,530 | A * | 4/1975 | Purdy | 414/526 |
| 4,664,446 | A * | 5/1987 | Word | 298/8 H |
| 5,013,207 | A * | 5/1991 | Baker et al. | 414/489 |
| 5,139,314 | A * | 8/1992 | Deckler | 280/400 |
| 5,340,265 | A | 8/1994 | Grieshop | |
| 6,296,435 | B1 | 10/2001 | Wood et al. | |

OTHER PUBLICATIONS

Parker Grain Carts, 524, 624, 737, Parker, P.O. Box 357, Kalida, Ohio 45853.

J & M Patented Front Folding Auger Carts, Models 1075-18R, 1075-22R J. & M. Mfg. Co., Inc., P.O. Box 547, Ft. Recovery, OH 45846.

Unverferth Grain Carts: It's Like Mid-Air Refueling For Your Combine, Unverferth Manufacturing Company, Inc. P.O. Box 357, Kalida OH 45853.

Brent For the Ultimate In High-Speed Grain Handling Brent 80 Series, Unverferth Manufacturing Company, Inc. PO Box 357, Kalida OH 45853.

Brent 76 Series Corner-Auger Grain Carts, Unverferth Manufacturing Company, Inc., P.O. Box 357, Kalida, Ohio 45853.

* cited by examiner

*Primary Examiner*—James Keenan  
(74) *Attorney, Agent, or Firm*—Jacox, Meckstroth & Jenkins

(57) ABSTRACT

A grain wagon includes a wheel supported frame supporting a container having inclined front and rear walls connected by opposite inclined side walls. Each side wall has inwardly projecting wall portions defining a wheel well for receiving longitudinally offset dual wheels or extra wide wheels. The rear wall includes a portion sloping between the wheel well wall portions to a forward grain removal zone, and generally triangular diverter walls extend from the rear wall to the wheel well wall portions. A corner discharge auger conveyor extends from the grain removal zone and has an upper portion which pivots to a stored position adjacent the front wall of the container. The dual wheels are positioned within the wheel wells by support members having end portions pivotally connected to the wagon frame and opposite end portions connected to the frame by laterally slidable clamping plates.

24 Claims, 3 Drawing Sheets

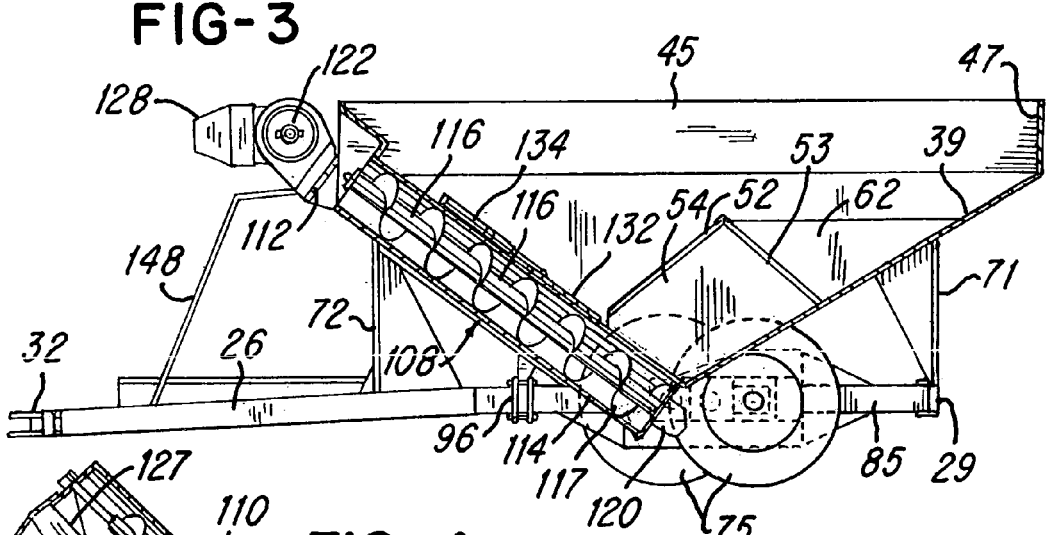
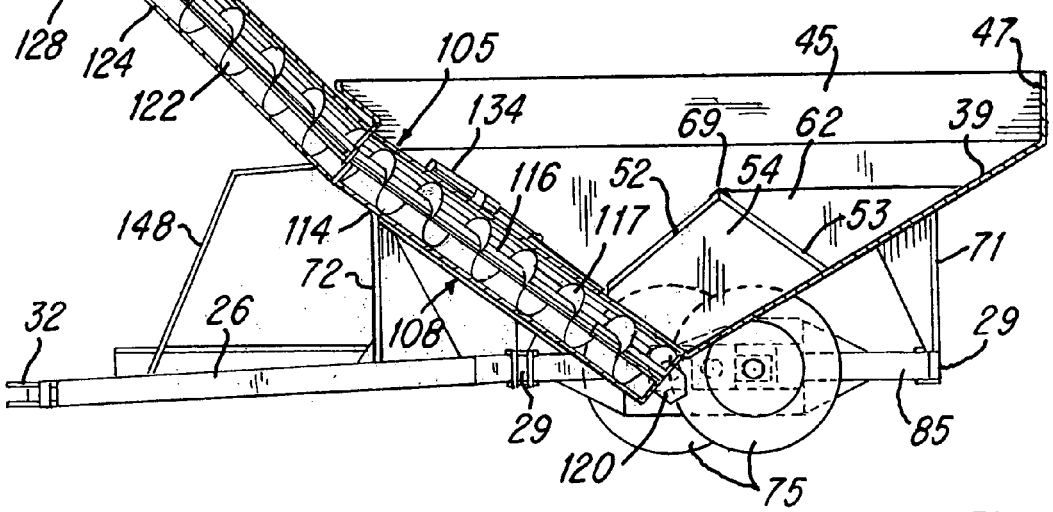
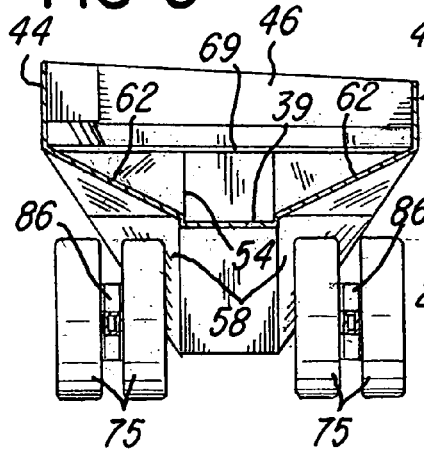
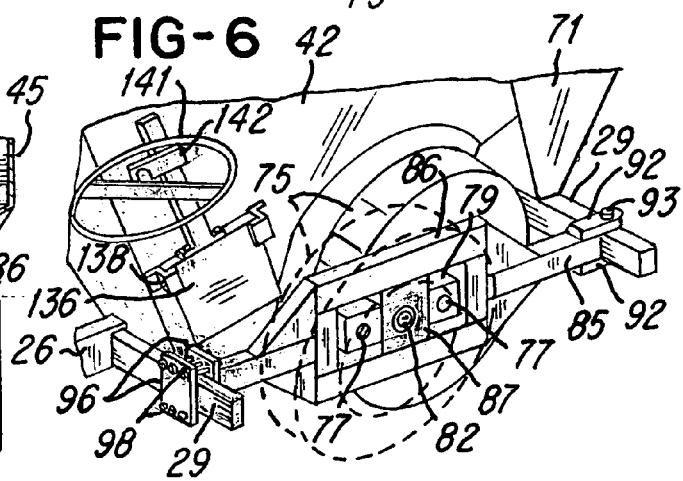

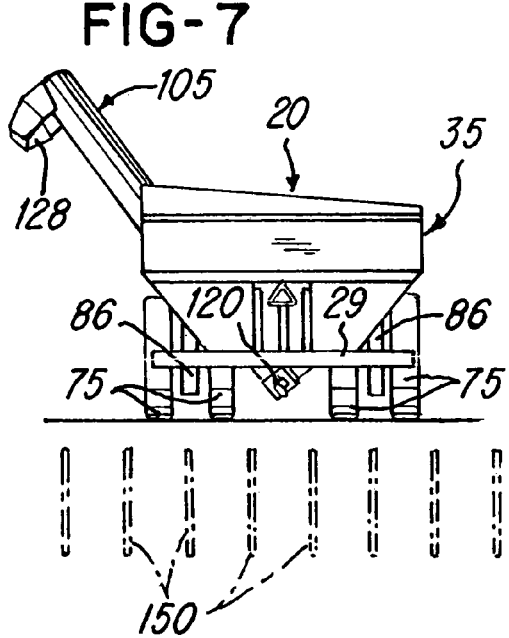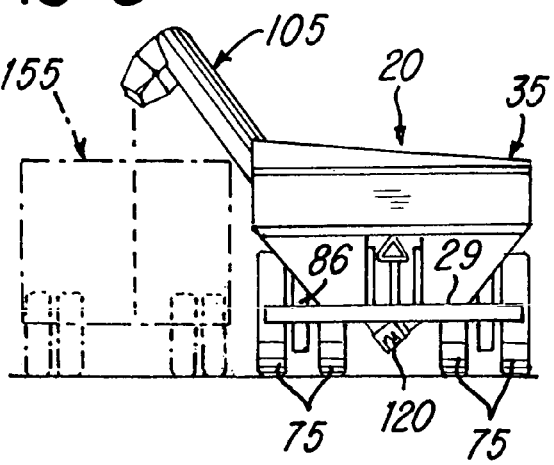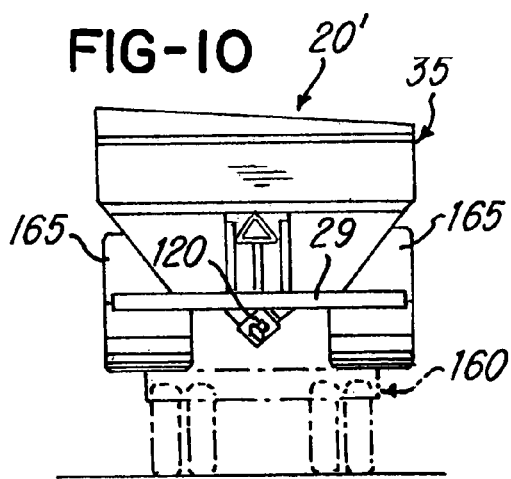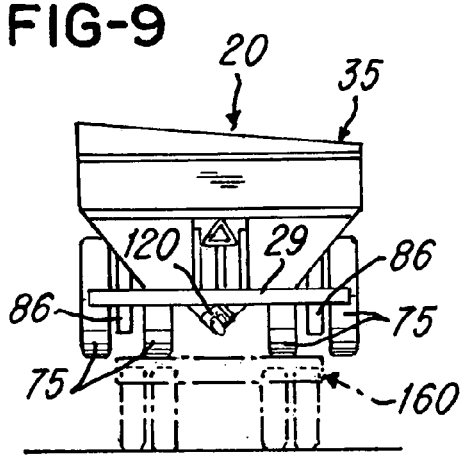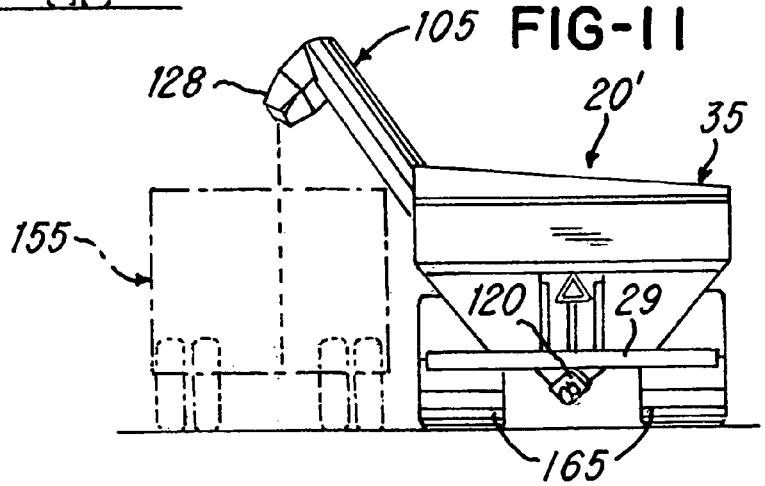

GRAIN WAGON WITH IMPROVED GRAIN CONTAINER

BACKGROUND OF THE INVENTION

The present invention relates to a grain cart or wagon having a hopper or container with a corner discharge auger conveyor and of the general type disclosed in U.S. Pat. Nos. 5,340,265 and 6,296,435 which issued to the assignee of the present invention. In such a grain cart, it is sometimes desirable for the hopper or container to have a capacity of at least 1,000 bushels of grain while having a single discharge auger conveyor instead of the commonly used dual auger conveyors. The dual conveyors usually include a horizontal bottom auger conveyor and a laterally inclined front auger conveyor for receiving the grain from the horizontal conveyor and discharging the grain into an adjacent semi-trailer which transports the grain to a remotely located elevator. While conventional dual conveyor grain wagons being sold have a capacity over 1,000 bushels, the dual auger systems are more costly to produce, have more mechanism to service, require more power to operate and require multiple clean-out locations. They also result in poor clean-out of grain from the container in addition to causing more damage to the grain when compared with a single auger discharge conveyor.

It is also desirable for a grain wagon to have an overall width no greater than 12 feet and an overall height under 13 feet in order to provide for conveniently transporting the grain cart along a roadway or on a semi-trailer without removing wheels or obtaining a special wide load road permit which is costly, time consuming to obtain and requires at least one escort vehicle. For many uses, it is desirable for a grain wagon to be supported by dual wheels on each side with the lateral spacing between the dual wheels being such to accommodate 30 inch and 36 inch row spacing of the crops within a field. Preferably, the laterally spaced dual wheels on each side are also tandem or offset longitudinally and are mounted on axles supported by a tilting crank member to provide a smoother ride for the wagon over a bumpy field. For some uses in fields having soft ground, it is sometimes desirable for the grain wagon to be supported by extra wide wheels. However, regardless of the desired wheel selection or arrangement, it is very desirable to maintain the overall width of the grain wagon including the wheels within the 12 feet limit. Also, by locating the wheels within the 12 feet width limit, a grain wagon with a 12 feet wide container does not present a problem of collision with a wide combine head and may be positioned closer to a semi-trailer during discharge or transfer of the grain from the grain wagon container into the semi-trailer and thereby obtain more uniform distribution of the grain within the trailer.

SUMMARY OF THE INVENTION

The present invention is directed to a grain wagon of the type disclosed in the above mentioned patents and having an improved grain container in order to provide all of the desirable features and advantages mentioned above. In accordance with a preferred embodiment of the invention, a grain wagon container includes opposite inclined side walls connected by an inclined front wall and an inclined rear wall, and all of the walls converge downwardly to a grain removal zone forward of the center of the container. The side walls have inwardly projecting wall portions defining wheel wells, and the rear wall slopes downwardly and forwardly between the wheel wells. Generally triangular side diverter walls connect wheel well wall portions to the inclined rear wall, and a single corner auger conveyor has a lower portion with an inlet adjacent the grain removal zone. An upper portion of the auger conveyor is supported for folding movement between a retracted stored position adjacent the front wall of the container and an operating position projecting upwardly, forwardly and laterally outwardly from the container.

In one embodiment, dual wheels are located within the wheel wells, and the dual wheels on each side are longitudinally offset by axles mounted on a crank arm supported by a shaft on a wheel support frame member. The member has one end portion pivotally connected to the wagon frame and the opposite end portion connected to the wagon frame by laterally slidable clamping plates. In another embodiment, the wagon has extra wide single wheels on each side, and the wheels project into the wheel wells. In both embodiments, the wheels do not project laterally beyond the width of the container which preferably does not exceed 12 feet.

Other features and advantages of the invention will be apparent from the following description, the accompanying drawings and the appended claims.

BRIEF DESCRIPTION OF THE DRAWINGS

FIG. 3 is a part section view of the grain wagon, taken generally on the line 3—3 of FIG. 2 and showing an upper portion of the discharge auger conveyor in its stored position;

FIG. 4 is a section view similar to FIG. 3 and showing the upper portion of the discharge auger conveyor in its operating position;

FIG. 5 is a cross section of the grain wagon, taken generally on the line 5—5 of FIG. 2;

FIG. 6 is a fragmentary perspective view of a support system for one set of the dual wheels shown in FIG. 1;

FIG. 7 is a rear elevational view of the grain wagon shown in FIG. 1 and diagrammatically illustrating wheel spacing in relation to crop row spacing;

FIG. 8 is a rear elevational view of the grain wagon shown in FIG. 1 and illustrating its close proximity during unloading of grain into a semi-trailer shown in phantom;

FIG. 9 is an end view of the grain wagon shown in FIG. 1 and being transported along a highway on a semi-trailer bed;

FIG. 10 is a view similar to FIG. 9 and illustrating the transport of a grain wagon having extra wide wheels; and FIG. 11 is an end view of the grain wagon shown in FIG. 10 and illustrating its close position to a semi-trailer shown in phantom during transfer of the grain into a semi-trailer.

DESCRIPTION OF THE PREFERRED EMBODIMENTS

Figure 1:
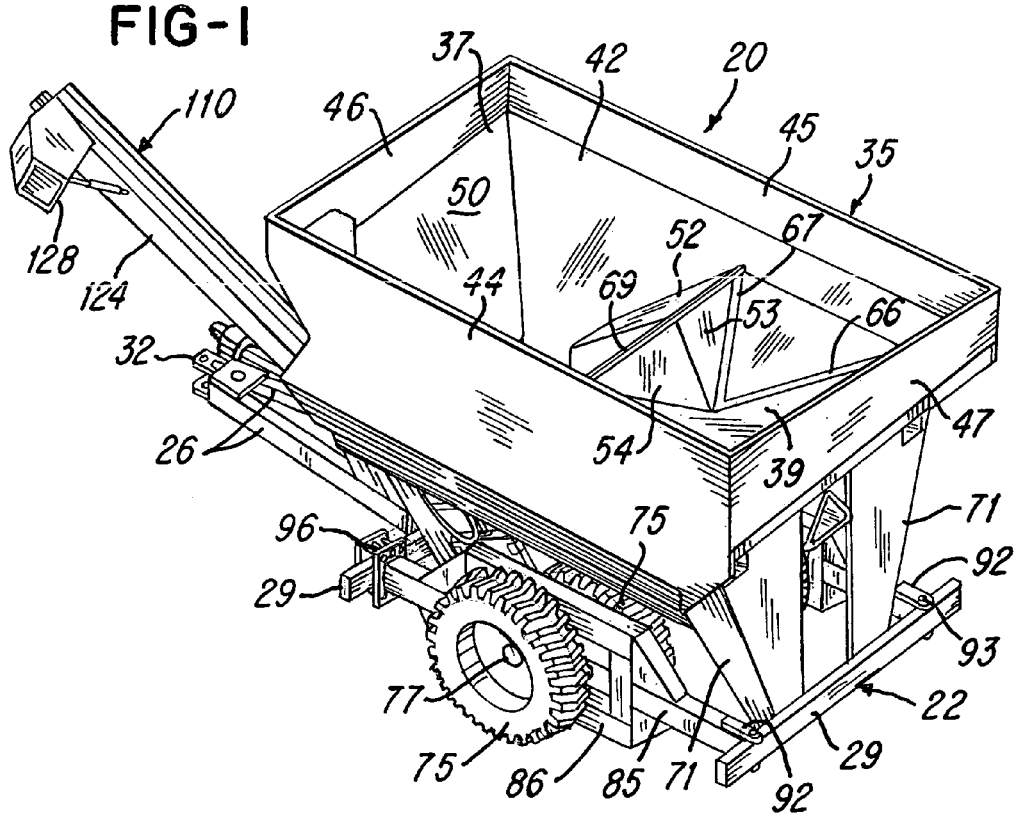
FIG. 1 is a perspective view of a grain wagon constructed in accordance with the invention.

FIG. 1 illustrates a grain cart or wagon 20 which has a general construction similar to the grain wagons disclosed in above-mentioned U.S. Pat. Nos. 5,340,265 and 6,296,435, the disclosures of which are herein incorporated by reference. The grain wagon 20 has a fabricated steel frame 22 formed by longitudinally extending tubular steel frame members 26 which are rigidly connected by cross tubular steel frame members 29 and converge at the front of the wagon to form a tongue having a hitch 32. The wagon is adapted to be pivotally connected to a tow vehicle such as a farm tractor shown in the above-mentioned patents. In accordance with the present invention, a fabricated sheet metal grain hopper or container 35 includes a sloping or inclined front wall 37 and an inclined rear wall 39 which are rigidly connected by inclined opposite side walls 42. Vertical top extension walls 44, 45, 46 and 47 project upwardly from the inclined side, front and rear walls, respectively, and form a rectangular top opening for a grain receiving chamber 50 defined by the container 35.

Figure 2:
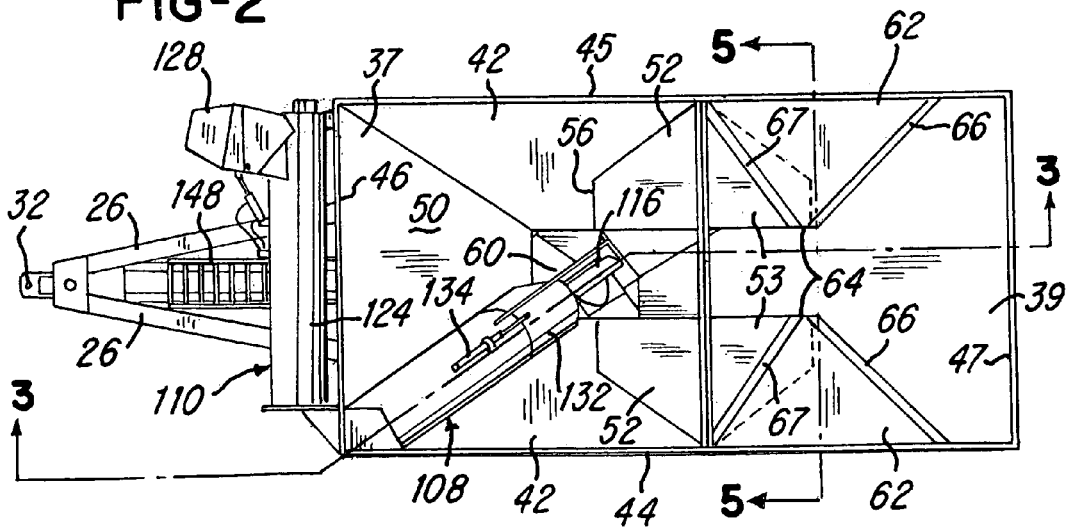
FIG. 2 is a plan view of the grain wagon shown in FIG. 1.

A set of connected sheet metal panels or wall portions 52, 53, 54 and 56 project inwardly from each of the opposite side walls 42 and define a wheel well 58 (FIG. 5) on each side of the grain wagon. As apparent from FIGS. 1 and 2, the wheel well wall portion 52 has a trapezoid configuration, the wall portions 53 and 56 have triangular configurations, and the wall panel or portion 54 is vertical. As shown in FIG. 2, the rear panel or wall 39 slopes downwardly and forwardly and continues between the opposing vertical wheel well wall panels or portions 54 to a grain removal zone 60, and the side walls 42 and front wall 37 also converge to the grain removal zone 60. A pair of generally triangular and inclined diverter panels or walls 62 are located rearwardly of the wheel well wall panels or portions in opposing relation and connect the inclined wheel well wall panels or portions 53 to the inclined rear wall 39. Each of the diverter walls 62 has a short straight bottom edge 64 providing the wall with a trapezoid configuration, and elongated flat corner strips 66 and 67 connect each diverter wall 62 to the rear wall 39 and to the wheel well wall portion 53. A cross tie angle or member 69 connects the top of wall portions 52 and 53 of both wheel wells 58 to provide added strength to the container. As shown in FIGS. 1 and 4, fabricated sheet metal support panels or members 71 and 72 extend between the rear wall 39 and the front wall 37 to the cross frame members 29 to support the container 35 on the frame 22.

Referring to FIGS. 1–6, the frame 22 and container 35 are supported for ground transversing movement by a set of wheels which include a pair of dual wheels 75 on each side of the grain wagon 20. The dual wheels 75 on each side are offset longitudinally and are supported by corresponding axles 77 (FIG. 6) which project from opposite sides of a crank or tilting member 79 supported for pivotal or tilting movement by a center shaft 82. The shaft 82 is supported by an elongated wheel support frame member 85 having a rectangular frame-like center portion 86 with parallel spaced plates 87 supporting the shaft 82 and member 79. The tilting support for each set of longitudinally offset dual wheels 75 provide the grain cart 20 with a smoother ride over rough ground. As shown in FIG. 5, the dual wheels 75 project into the wheel wells 58 so that the overall width of the dual wheels 75 does not exceed the overall width of the container 35 as determined by the vertical side extension walls 44 and 45.

Referring to FIG. 6, each of the wheel support frame members 85 has a rearward end portion pivotally connected to the cross frame member 29 by yoke members or plates 92 and a vertical pivot pin 93. The forward end portion of each wheel support frame 85 is rigidly connected to the front cross frame member 29 by a pair of spaced vertical clamping members or plates 96 which are clamped together by a series of tie bolts 98. When the bolts 98 are released, the wheel support frame member 85 may be pivoted outwardly to facilitate convenient servicing the inner wheel 75. The pivot pin 93 and clamping plates 96 also provide for conveniently obtaining precision longitudinal alignment of each set of dual wheels 75.

Grain is emptied from the container chamber 50 by an inclined corner auger conveyor 105 which is constructed similar to the auger conveyor disclosed in above mentioned U.S. Pat. No. 5,340,265, but which is somewhat larger in diameter, for example, 22 inches in diameter. The conveyor 105 includes a fixed lower portion or section 108, which intersects the front wall 37, and an upper portion or section 110 which are pivotally connected by a hinge 112 (FIG. 3). The lower conveyor portion or section 108 has a cylindrical housing 114 which is recessed within the front left corner of the container 35 and encloses an auger 116 having a helical flight 117 and driven through a gear box 120 located at the lower end of the conveyor 105 and driven by a shaft connected to the power take off on the tow vehicle. As shown in FIGS. 2 and 4, the lower end of the auger 116 projects into the grain removal well or zone 60, and the upper end of the auger 116 is coupled to a similar auger 122 extending within a cylindrical housing 124 forming the upper portion or section 110 of the conveyor 105.

The upper conveyor section 110 has an upper end portion with a discharge opening 127 and supports a pivotal and controllable discharge spout 128 of the type disclosed in above-mentioned U.S. Pat. No. 6,296,435. As shown in FIGS. 1–4, the upper section 110 of the inclined discharge conveyor 105 pivots from a storage position (FIGS. 2 & 3) adjacent the front wall extension 46 and an operating position (FIGS. 1 & 4) projecting laterally outwardly, upwardly and forwardly of the container 35. In the operating position, the axis of the upper section 110 of the conveyor 105 extends in line or at a slight angle of about 6° relative to the axis of the lower section 108 of the conveyor. As shown in FIG. 2, a part-cylindrical shut-off gate 132 is supported for sliding movement on the housing 114 of the lower conveyor portion 108. The gate 132 is operated by a hydraulic cylinder 134 to control the flow rate of grain into the lower end portion of the auger 116 within the grain removal zone 58. As shown in FIG. 6, and in a conventional manner, the left side wall 42 has a clean out opening adjacent the lower end portion of the auger 116, and the opening is normally closed by a closure or gate 136 slidably supported by brackets 138 mounted on the side wall 42. An actuating wheel 141 operates the gate 136 through a rack and pinion mechanism 142. As shown in FIGS. 2 & 3, a ladder 148 extends from the converging frame members 26 to the front wall 37 of the container 35 to facilitate inspection of the grain within the container chamber 50.

Referring to FIGS. 3–5, the forward and downward slope of the rear wall 39 of the container 35 is preferably at an angle within the range of 25° to 35° with respect to horizontal reference plane, and the front wall 37 preferably extends at an angle within the range of 35° to 40° relative to a horizontal reference plane. Preferably, each side wall 42 extends at an angle within the range of 48° to 52°, and the diverter panels or walls 62 slope at an angle within the range of 25° to 35° with respect to a horizontal reference plane. The front wheel well wall portion 52 extends at an angle of about 40°, and the rear wheel well wall portion 53 extends at an angle of about 30° so that the included angle between the wall portions 52 and 53 is at least 90° and preferably about 110°. The wall portions 52 and 53 may also be rounded or semi-cylindrical.

Referring to FIG. 7, the grain wagon 20 is illustrated in relation to a plurality of parallel spaced crop rows 150, such as rows of corn which commonly have row spacing of 30 inches or 36 inches between rows. It is sometimes desirable for the dual wheels 75 to be spaced between the rows as the grain wagon is pulled along a field in order to prevent the weight of the grain wagon and grain from compacting the rows of crops. The container 35 of the present invention permits the spacing of the dual wheels 75 while maintaining the overall width of the wheels no greater than the overall width of the container 35. As shown in FIG. 8, by maintaining the overall width of the wheels 75 within the width of the container 35, the grain wagon 20 may be pulled alongside a semi-trailer 155 in closely spaced relation so that the grain discharged by the conveyor 105 from the container 35 into the semi-trailer 155 may be more uniformly distributed across the width of the semi-trailer. Referring to FIG. 9, the grain wagon 20 may also be conveniently transported on a roadway by a low bed transport trailer 160 without removing any of the dual wheels 75 since the overall width of the wheels is within the 12 foot width of the container 35. As a result, no special road permit is required for transporting the grain wagon 20 along a roadway with the trailer. In most states, when the width is over 12 feet, the driver must obtain a special wide load permit and at least one escort vehicle is also required.

Referring to FIGS. 10 and 11, a grain wagon 20' is constructed the same as the grain cart 20 except that the grain container 35 is supported by a pair of extra wide wheels 165 in place of the dual tandem and walking wheels 75. The extra wide wheels 165 are sometimes desirable when the ground is soft and there is no concern about the wheels compacting the crop rows 150. As shown in FIG. 10, the extra wide wheels 165 also project into the wheel wells 58 of the container 35 so that the overall width of the wheels 165 does not significantly exceed the overall width of 12 feet of the container 35. As shown, the outer surfaces of the wide wheels 165 are generally flush with the outer side surfaces of the container 35. As such, the grain wagon 20' may also be transported along the roadway on a low bed semi-trailer 160 (FIG. 10) and may be closely positioned adjacent a semi-trailer 155, as shown in FIG. 11 in order to obtain more uniform distribution of the grain within the semi-trailer as it is being discharged from the container 35 by the auger conveyor 105.

From the drawings and the above description, it is apparent that a grain cart or wagon having a container 35 constructed in accordance with the present invention provides desirable features and advantages. That is, by constructing the sheet metal container 35 as described above, the container can easily hold and transport over 1,000 bushels of grain, and only a single auger conveyor 105 is required to quickly unload the grain from the container. In addition, the deep wheel wells 58 of the container permit the grain cart to be supported by either dual tandem wheels 75 or single extra wide wheels 165 while maintaining the overall width of the wheels within the overall width of the container 35. As a result, the grain cart may be conveniently transported on a low bed trailer without removing any wheels and without obtaining a special road permit for oversize loads. The narrow wheel width also permits pulling the grain cart closely alongside a semi-trailer to facilitate unloading the grain with the single front-folding corner auger conveyor 105. The slight angular position of the upper conveyor section 110 relative to the lower conveyor section 108, as shown in FIG. 4, also sometimes facilitates positioning the upper conveyor section 110 and unloading into a semi-trailer, especially when using the pivotal discharge spout controlled from the tow vehicle, as described in above mentioned U.S. Pat. No. 6,296,435. Another feature is provided by mounting of the dual and tandem or longitudinally offset wheels 75 with the wheel support frame member 85 pivoted to one cross frame member 29 on one end by the pivot pin 93 and having an opposite end connected to another cross frame member 29 by the clamping plates 96. This structure permits the inner wheel of the dual wheels to be conveniently repaired or replaced simply by releasing the clamping plates 96 from the frame member 29 and pivoting the wheel frame 85 to an outwardly projecting position. The clamping plates also provide for conveniently obtaining precision longitudinal alignment of the dual wheels 75 after servicing of the wheels is completed.

While the form of grain wagon herein described constitutes a preferred embodiments of the invention, it is to be understood that the invention is not limited to this precise form of grain wagon, and that changes may be made therein without departing from the scope and spirit of the invention as defined in the appended claims.

What is claimed is:

1. A grain wagon adapted to be pivotally connected to a tow tractor for transferring grain from a combine in a field to an open-top trailer, said wagon comprising a frame supported by a set of wheels, a container supported by said frame and defining a chamber for receiving a volume of grain, said container including opposite inclined side walls connected by an inclined front wall and an inclined rear wall, all of said walls converging downwardly to a grain removal zone, a single elongated auger conveyor including a power driven conveyor auger within a housing and having an inclined lower portion pivotally connected to an upper portion, said lower portion of said auger conveyor positioned to receive grain from said grain removal zone, said upper portion of said auger conveyor supported for folding movement between a retracted stored position adjacent said container and an operating position projecting upwardly and laterally outwardly from said container, said container further including wheel well wall portions projecting inwardly in opposing relation from said inclined side walls and defining wheel wells, said inclined rear wall including a portion sloping forwardly and downwardly between said wheel well wall portions to said grain removal zone, and a pair of opposing inclined diverter walls connecting said inclined rear wall to said wheel well wall portions for obtaining gravity flow of all the grain in said chamber to said grain removal zone and said single auger conveyor.

2. A grain wagon as defined in claim 1 wherein said set of wheels comprise laterally spaced dual wheels projecting into each of said wheel wells, and said wheels have outer side surfaces generally flush with outer side surfaces of said container.

3. A grain wagon as defined in claim 2 wherein said dual wheels within each wheel well are longitudinally offset and are supported by corresponding axles mounted on a tilting wheel support member.

4. A grain wagon as defined in claim 1 wherein said set of wheels comprise extra wide wheels projecting into said wheel wells and having outer side surfaces generally flush with outer side surfaces of said container.

5. A grain wagon as defined in claim 1 wherein said rear wall of said container extends forwardly and downwardly at an angle between 25° and 35° from a horizontal reference plane.

6. A grain wagon as defined in claim 1 wherein each of said diverter walls is generally triangular and extends downwardly and laterally inwardly at an angle between 25° and 35° from a horizontal reference plane.

7. A grain wagon as defined in claim 1 wherein each of said inclined side walls extends downwardly and laterally inwardly at an angle between 45° and 55° from a horizontal reference plane.

8. A grain wagon as defined in claim 1 wherein each of said wheel well wall portions include an inclined front wall portion and an inclined rear wall portion defining therebetween an angle greater than 90°.

9. A grain wagon as defined in claim 1 wherein said wheel well wall portions include generally vertical and spaced opposing inner wall portions, and said portion of said rear wall extends downwardly and forwardly between said generally vertical inner wall portions.

10. A grain wagon as defined in claim 1 wherein each of said diverter walls is generally triangular in configuration.

11. A grain wagon as defined in claim 10 and including an elongated generally flat and inclined corner strip connecting each of said diverter walls to said inclined rear wall.

12. A grain wagon as defined in claim 10 wherein each of said diverter walls has a trapezoid configuration.

13. A grain wagon as defined in claim 1 and including a pair of elongated wheel frame members on opposite sides of said container, said set of wheels including laterally spaced dual wheels mounted on each of said wheel frame members, a pivotal support connecting one end portion of each said wheel frame member to said frame, and a laterally moveable clamping member connecting an opposite end portion of each said wheel frame member to said frame.

14. A grain wagon adapted to be pivotally connected to a tow tractor for transferring grain from a combine in a field to an open-top trailer, said wagon comprising a frame supported by a set of wheels, an elongated container supported by said frame and defining a chamber having a generally rectangular top opening for receiving a volume of grain, said container including opposite inclined side walls connected by an inclined front wall and an inclined rear wall, all of said walls converging downwardly to a grain removal zone, a single elongated auger conveyor including a power driven auger within a tubular housing and having an inclined lower portion pivotally connected to an upper portion, said lower portion of said auger conveyor positioned to receive grain from said grain removal zone, said upper portion of said auger conveyor supported for folding movement between a retracted stored position adjacent said container and an operating position projecting upwardly and laterally outwardly from said container, said container further including wheel well wall portions projecting inwardly in opposing relation from said inclined side walls and defining wheel wells, said set of wheels including laterally spaced and longitudinally offset dual wheels projecting into each of said wheel wells, a wheel support member connecting said dual wheels within each said wheel well and pivotally connected to said frame, said wheels have outer side surfaces generally flush with outer side surfaces of said container, said inclined rear wall including a portion sloping forwardly and downwardly between said wheel well wall portions to said grain removal zone, and a pair of opposing inclined diverter walls connecting said inclined rear wall to said wheel well wall portions for obtaining gravity flow of all the grain in said chamber to said grain removal zone and said single auger conveyor.

15. A grain wagon as defined in claim 14 wherein said rear wall of said container extends forwardly and downwardly at an angle between 25° and 35° from a horizontal reference plane.

16. A grain wagon as defined in claim 14 wherein each of said diverter walls is generally triangular and extends downwardly and laterally inwardly at an angle between 25° and 35° from a horizontal reference plane.

17. A grain wagon as defined in claim 14 wherein said wheel well wall portions include generally vertical and parallel spaced opposing inner wall portions.

18. A grain wagon as defined in claim 14 and including an elongated generally flat and inclined corner strip connecting each of said diverter walls to said inclined rear wall.

19. A grain wagon as defined in claim 14 wherein each of said diverter walls has a trapezoid configuration.

20. A grain wagon as defined in claim 14 and including an elongated wheel frame member pivotally supporting each of said wheel support members, a pivotal support connecting one end portion of each said wheel frame member to said frame, and a laterally moveable clamping member connecting an opposite end portion of each said wheel frame member to said frame.

21. A grain wagon adapted to be pivotally connected to a tow tractor for transferring grain from a combine in a field to an open-top trailer, said wagon comprising a frame supported by a set of wheels, an elongated container supported by said frame and defining a chamber having a generally rectangular top opening for receiving a volume of grain, said container including opposite inclined side walls connected by an inclined front wall and an inclined rear wall, all of said walls converging downwardly to a grain removal zone, a single elongated auger conveyor including a power driven auger within a tubular housing and having an inclined lower portion pivotally connected to an upper portion, said lower portion of said auger conveyor positioned to receive grain from said grain removal zone, said upper portion of said auger conveyor supported for folding movement between a retracted stored position adjacent said front wall of said container and an operating position projecting upwardly, forwardly and laterally outwardly from said container, said container further including wheel well wall portions projecting inwardly in opposing relation from said inclined side walls and defining wheel wells, said inclined rearwall including a portion sloping forwardly and downwardly between said wheel well wall portions to said grain removal zone, and a pair of opposing inclined diverter walls connecting said inclined rear wall to said wheel well wall portions for obtaining gravity flow of all the grain in said chamber to said grain removal zone and said single auger conveyor.

22. A grain wagon as defined in claim 21 wherein said set of wheels comprise a pair of extra wide wheels projecting into said wheel wells and having outer side surfaces generally flush with outer side surfaces of said container.

23. A grain wagon as defined in claim 21 wherein said set of wheels comprise a set of laterally spaced dual wheels projecting into each of said wheel wells, each said set of dual wheels are longitudinally offset.

24. A grain wagon as defined in claim 21 wherein each of said diverter walls is generally triangular in configuration.

* * * * *